United States Patent [19]

Shigehara

[11] Patent Number: 5,638,222
[45] Date of Patent: Jun. 10, 1997

[54] OPTICAL ELEMENT POSITIONING DEVICE

[75] Inventor: Makoto Shigehara, Hachioji, Japan

[73] Assignee: Olympus Optical Co., Ltd., Japan

[21] Appl. No.: 494,966

[22] Filed: Jun. 26, 1995

[30] Foreign Application Priority Data

Jun. 29, 1994 [JP] Japan .................................. 6-147432

[51] Int. Cl.$^6$ .................................................... G02B 7/02
[52] U.S. Cl. ............................ 359/814; 359/813; 359/821
[58] Field of Search ................................. 359/814, 813, 359/821, 822

[56] References Cited

U.S. PATENT DOCUMENTS

| | | | |
|---|---|---|---|
| 4,266,855 | 5/1981 | Mohr | 359/821 |
| 4,790,628 | 12/1988 | Nanno et al. | 359/814 |
| 4,863,240 | 9/1989 | Nakajima et al. | 359/814 |
| 4,998,802 | 3/1991 | Kasuga et al. | 359/814 |
| 5,289,318 | 2/1994 | Sekine et al. | 359/813 |

FOREIGN PATENT DOCUMENTS

51-70545  6/1976  Japan .
55-159214 12/1980 Japan .

*Primary Examiner*—Loha Ben
*Attorney, Agent, or Firm*—Laff, Whitesel, Conte & Saret, Ltd.

[57] ABSTRACT

An optical element positioning device comprises a fixed member fixed to an optical apparatus having an optical axis, a movable member supported by the optical apparatus so as to be movable with respect to the fixed member, and holding a plurality of optical elements along the moving direction, a first permanent magnet arranged in the fixed member, and a plurality of second permanent magnets equal in number of the optical elements, disposed in the movable member along the moving direction and selectively able to face the first permanent magnet when the movable member is moved. The first magnet and each of the second magnets have a magnetic pole surfaces which face with each other, and lines of attracting magnetic force are generated between the magnets when the magnets are made face each other the first magnet and each of the second magnets have extending portions close to each other, and the lines of attracting magnetic force form a closed loop passing through the extending portion to give the movable member a force which stops the movable member, thereby positioning one of the optical elements on the optical axis.

8 Claims, 4 Drawing Sheets

OPTICAL ELEMENT POSITIONING DEVICE

BACKGROUND OF THE INVENTION

1. Field of the Invention

The present invention relates to an optical element positioning device for positioning optical elements such as an objective lens, a prism, and an optical filter.

2. Description of the Related Art

Generally, an optical path switching device for an optical microscope is known as an optical element positioning device used in an optical microscope. In this optical path switching device, a revolver which includes various detachable objective lenses different in magnification is rotated to interchange the objective lenses with respect to the optical axis, thereby switching the magnifications. Also, a turret condenser in which a plurality of ring stops or iris stops for a bright field are concentrically arranged is incorporated into the microscope main body so as to be freely inserted and removed. The combination of these mechanisms makes it possible to handle a broad range of objective lenses.

Figure 9:
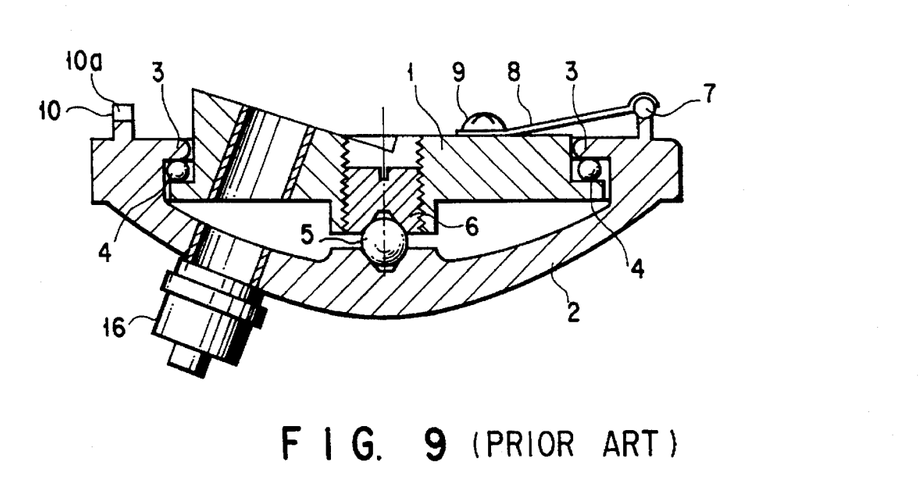
FIG. 9 is a sectional view showing a locking mechanism of a revolver of a conventional optical element interchanging device.

Jpn. UM. Appln. KOKAI Publication No. 51-70545 describes an optical element interchanging device of an optical microscope, in which a revolver includes a locking mechanism for positioning an objective lens on the optical axis. FIG. 9 shows this locking mechanism of the revolver.

A rotating ring 2 is rotatably attached to a revolver main body 1 of an optical microscope. Between the outer circumferential portion of the revolver main body 1 and the inner circumferential portion of the rotating ring 2, a press ring 3 fixed to the rotating ring 2 is provided. A large number of balls 4 are placed between the lower surface of the press ring 3 and the upper surface of the outer circumferential portion of the revolver main body 1, constituting a ball bearing.

A ball 5 is held in a recess formed in the rotation center of the rotating ring 2. This ball 5 is pressed with a predetermined force by a press screw 6 which is threadably engaged to extend through the revolver main body 1 from its upper surface. Thus the ball 5 is clamped between the press screw 6 in the revolver main body 1 and the recess of the rotating ring 2.

With the above structure, the rotating ring 2 is held by the revolver main body 1 so as to be rotatable around the ball 5.

A locking mechanism for positioning the rotating ring 2 at a predetermined angular position has a leaf spring 8. A steel ball 7 is supported at the distal end portion of the leaf spring 8, and a proximal end portion 9 of the leaf spring 8 is fixed on the upper surface of the revolver main body 1. Annular guide portion 10 integrally projects from the upper surface near the outer circumference of the rotating ring 2. V-grooves 10a are formed at positions on the upper surface of the guide portion 10 which correspond to the stop positions of individual objective lenses 16 different in magnification. The steel ball 7 is pressed against the upper surface of the guide portion 10 by the leaf spring 8.

In the above locking mechanism, when the selected one of the objective lenses 16 comes close to the optical axis upon rotation of the rotating ring 2, the steel ball 7 is drawn to the selected V-groove 10a and dropped into it by the biasing force of the leaf spring 8. As a result, the rotating ring 2 is stopped with no rocking motion by the biasing force of the leaf spring 8, and the desired objective lens 16 is positioned on the optical axis accordingly.

In the locking mechanism described above, there is a variation in the biasing force of the leaf spring 8 before and after the steel ball 7 is dropped into the V-groove 10a. Consequently, an impact force is produced when the steel ball 7 is quickly pushed into the V-groove 10a. This impact force is felt by an observer when he or she switches the objective lenses 16 by rotating the rotating ring 2. The observer, therefore, can confirm that the desired objective lens 16 is positioned on the optical axis.

Figure 10:
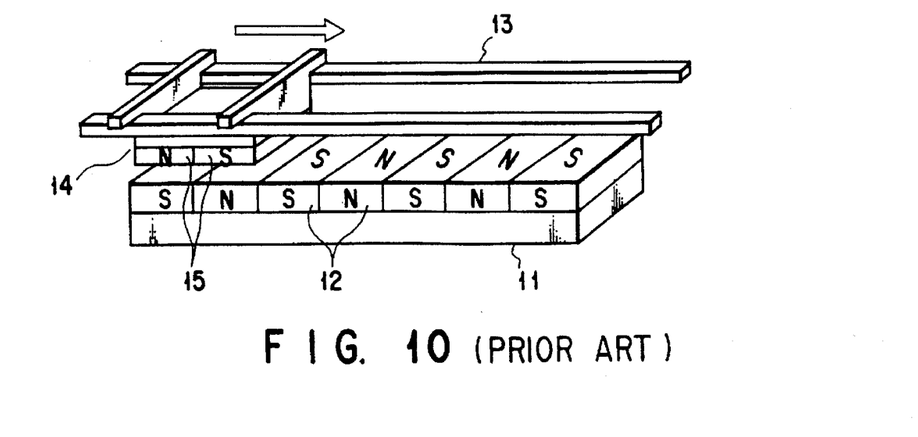
FIG. 10 is a perspective view showing a click stop mechanism of a conventional optical element interchanging device.

Jap. Pat. Appln. KOKAI Publication No. 55-159214 describes an optical element interchanging device of an optical microscope, which includes a click stop mechanism which moves and stops, at equal pitches, a movable member using a magnetic attracting element. FIG. 10 illustrates this click stop mechanism.

On the upper surface of a fixed plate 11 of a stationary member of this mechanism, a plurality of permanent magnets 12 are arranged at equal pitches so that the magnetic poles on the upper surfaces of the neighboring magnets are opposite to each other. A pair of parallel guides 13 are disposed parallel to the upper surface of the fixed plate 11, i.e., the upper surfaces of the permanent magnets 12 with a predetermined distance between them, extending in the direction of arrangement of these permanent magnets. A movable plate 14 is slidably mounted on these guides 13. This movable plate 14 includes a pair of permanent magnets 15 on the surface opposing the permanent magnets 12 of the fixed plate 11. These permanent magnets 15 have opposite magnetic poles on their lower surfaces. The movable plate 14 is slid along the guides 13 either manually or automatically.

In the above structure, while the movable plate 14 is sliding if the magnetic pole of the permanent magnet 12 of the fixed plate 11 and the magnetic pole of the permanent magnet 15 of the movable plate 14 sliding along the guides 13 become opposite to each other between the opposing surfaces, it is possible to stop the movable plate 14 sliding along the guides 13 by the action of the magnetic attracting force produced between the opposite magnetic poles. On the other hand, if the magnetic pole of the permanent magnet 12 of the fixed plate 11 and the magnetic pole of the permanent magnet 15 of the movable plate 14 agree with each other between the opposing surfaces, it is possible to rapidly slide the movable member 14 by the action of the magnetic repulsing force produced between the two magnetic poles.

One recently known device uses an inverted optical microscope including a revolves positioned under a stage having the locking mechanism in combination with a micromanipulator to perform various micromanipulations for cells (e.g., gripping, piercing, injection, and cut) in addition to observation of cells.

Unfortunately, in performing manipulations by using the combination of the optical microscope and the micromanipulator, a manipulator needle which is already positioned for micromanipulations is moved by the impact force produced when the objective lens is positioned.

Additionally, if the steel ball 7 is constantly urged against the upper surface of the annular guide portion 10 by the biasing force of the leaf spring 8, the V-groove 10a is gradually abraded. This weakens the touch when the objective lens 16 is positioned or decreases the positioning accuracy.

Also, in the click stop mechanism shown in FIG. 10, in performing multi-pole magnetization for the permanent magnets 12 provided on the fixed plate 11 there is produced a partial difference in the strength between the magnetic forces or a slight difference in the boundary position between the N and S poles. The result is a difference in the magnetic attracting force between the permanent magnets 12 of the fixed plate 11 and the permanent magnets 15 of the movable plate 14. This makes accurate positioning impossible.

SUMMARY OF THE INVENTION

It is an object of the present invention to provide an optical element positioning device which can accurately position an optical element at a reference position, improves the durability, and reduces the impact upon positioning.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Embodiments of the present invention will be described below with reference to the accompanying drawings.

(First Embodiment)

Figure 1:
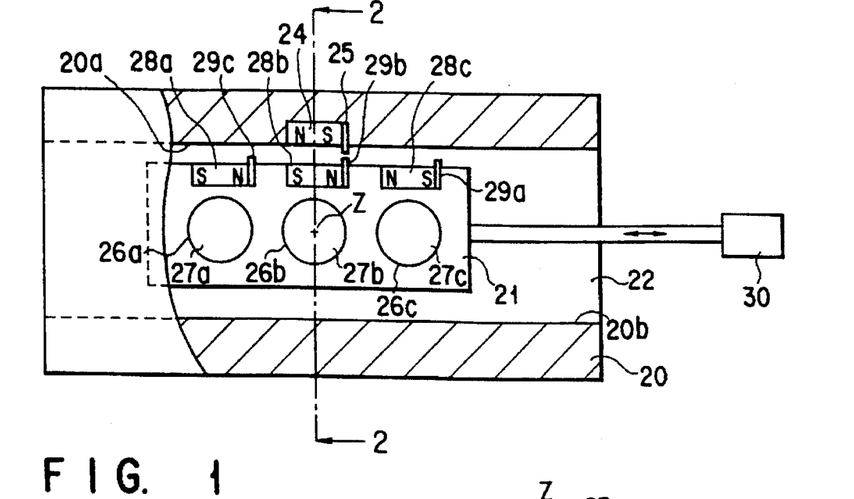
FIG. 1 is a partial sectional view of an optical element positioning device according to the first embodiment of the present invention.
Figure 2:
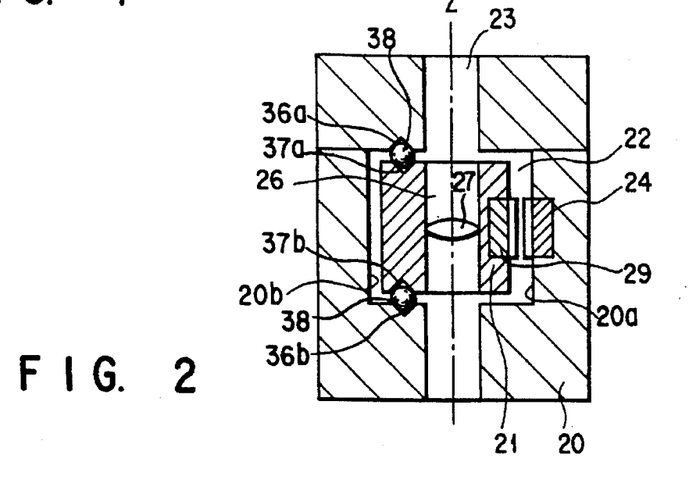
FIG. 2 is a sectional view taken along the line 2—2 in FIG. 1.
Figure 3A:
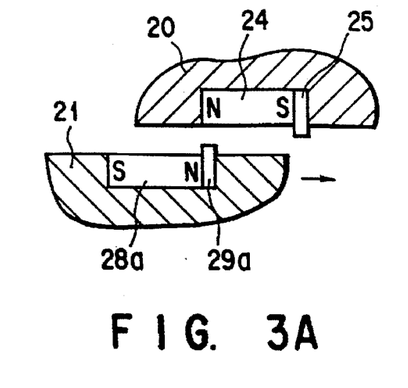
FIGS. 3A and 3B are enlarged views showing a portion of the device in FIG. 1 in different states.
Figure 3B:
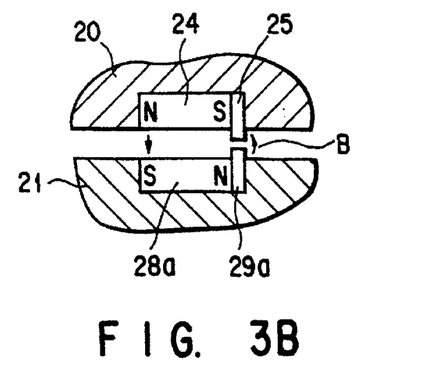

FIGS. 1, 2, 3A, and 3B show the sectional structure of an optical element positioning device according to the first embodiment of the present invention. FIG. 1 is a partial sectional view of the first embodiment. FIG. 2 is a sectional view taken along the line 2—2 in FIG. 1. FIGS. 3A and 3B are enlarged views of a portion of FIG. 1 in different states.

The optical element positioning device of this embodiment has a fixed frame 20 and a movable member 21 respectively made of a nonmagnetic material consisting of aluminum. The fixed frame 20 is a long, rectangular parallelepiped in which a rectangular movement space 22 which opens at least at its right end extends along the longitudinal direction of the fixed frame 20. A rectangular movable member 21 whose sectional area is smaller than that of the movement space 22 is inserted into the movement space 22 and supported by guide means so as to be movable in the longitudinal direction of the movement space 22.

Two through holes which define an optical path 23 having an optical axis Z are formed in central portions of the upper and lower portions (FIG. 2) of the fixed frame 20. These through holes are aligned with each other and extend from the movement space to the outer surfaces of the fixed frame. Inner surfaces or guide surfaces 20a and 20b of the opposing side portions of the fixed frame 20, i.e., the side portions of the fixed frame 20 in which no through holes are formed, are flat surfaces and define the two side surfaces of the movement space. In the side portion of the fixed frame 20 which defines the guide surface 20a, a permanent magnet 24 is embedded to expose to the guide surface 20a. This permanent magnet 24 assumes a rectangular shape and preferably has two magnetic poles on opposite surfaces. The order of the magnetic poles of this permanent magnet is N and S along the longitudinal direction of the fixed frame. To dispose this permanent magnet, a rectangular recess is formed in the guide surface 20a and the permanent magnet is inserted and fixed in this recess so that its magnetic pole surface is nearly leveled with the guide surface 20a. A thin-plate yoke 25 is inserted into the spacing between the S-pole-side end face of the permanent magnet 24 and one end face of the recess. The yoke 25 is made of a magnetic material such as low-carbon steel and preferably has the same width as the width of the end face of the permanent magnet. The yoke 25 is so disposed as to slightly project toward the movable member 21 from the surface of the permanent magnet 24, i.e., from the guide surface 20a.

The movable member 21 is a long, rectangular block extending along the fixed frame 20. In this block, three through holes 26a, 26b, and 26c each having a central axis parallel to the optical axis Z are formed at equal intervals along the longitudinal direction. Lenses 27a, 27b, and 27c different in magnification, as optical elements, are detachably arranged in these through holes 26a, 26b, and 26c, respectively, so that their respective optical axes are aligned with the central axes of these through holes.

Figure 8:
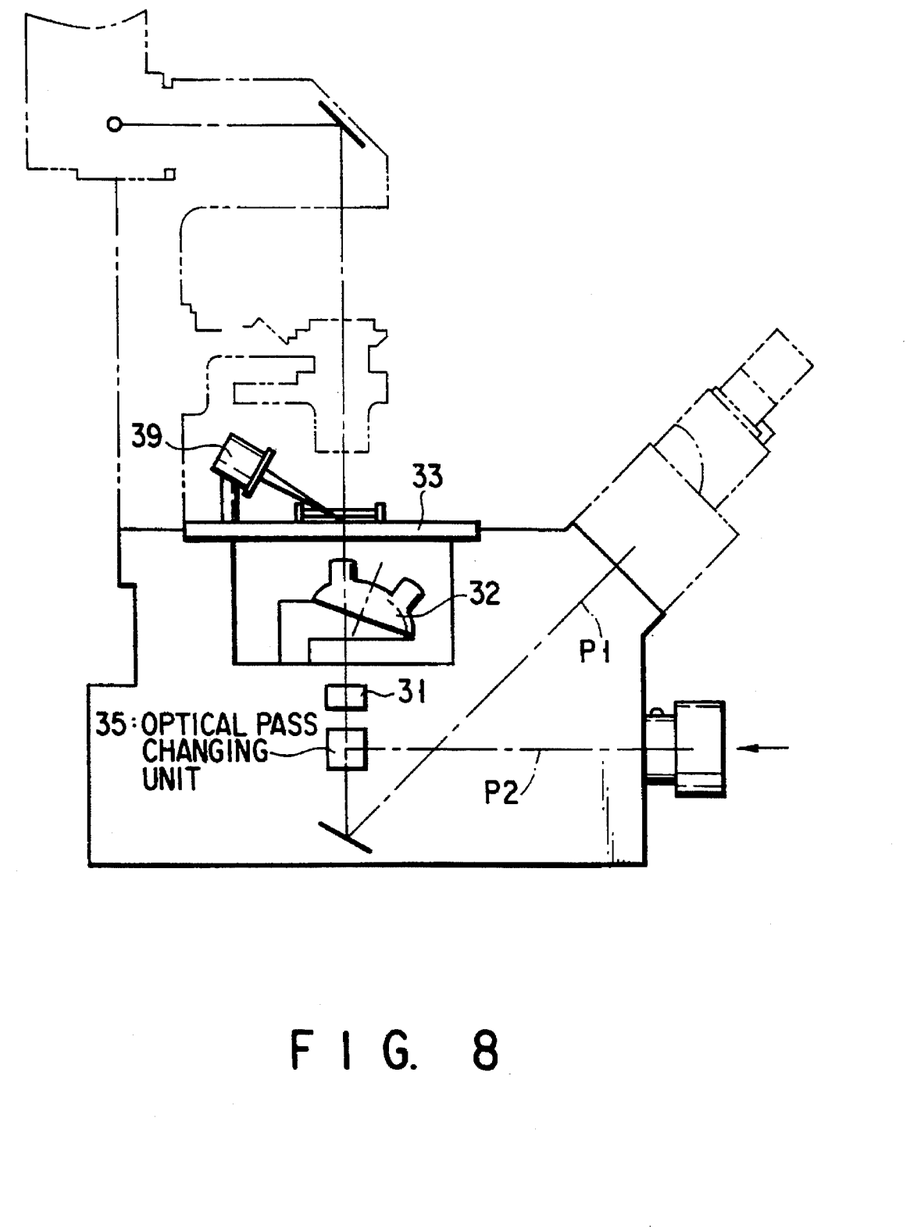
FIG. 8 is a view for schematically showing an inverted optical microscope.

A magnification varying unit 31 using the positioning device having an aforementioned construction is positioned on the common optical axis of an observation optical path P1 and a photographic optical path P2 of a conventional inverted microscope, between an objective lens revolver 32 positioned under a stage 33 and an optical pass changing unit 35, as shown in FIG. 8. The magnification of the observed image and photographed image may be adjusted by changing the objective lenses 27a–27c.

On the flat side surface of the movable member 21 opposing the guide surface 20a of the fixed frame 20 in which the permanent magnet 24 is embedded, three permanent magnets 28a, 28b, and 28c, each analogous to the permanent magnet 24, are arranged at the same equal intervals as the intervals between the lenses 27a, 27b, 27c along the longitudinal direction of the movable member. The order of the magnetic poles of these permanent magnets is S and N, i.e., opposite to the order of N and S of the permanent magnet 24 embedded in the guide surface 20a of the fixed frame 20. The permanent magnets 28a, 28b, and 28c are so embedded as to be leveled with a guide surface a of the movable member 21.

Thin-plate yokes 29a, 29b, and 29c are respectively disposed at the N-pole-side end faces of the permanent magnets of the movable member 21 so as to slightly project from the surface of the permanent magnets toward the stationary frame 20 side. Each of the yokes 29a, 29b, and 29c is made of a magnetic material such as low-carbon steel and preferably has the same width as and a slightly larger length than the N-pole-side end face.

As shown in FIG. 1, one end of a rod-like optical element switching lever 30 is attached to the right end face of the movable member 21. The other end of the switching lever 30 extends in the movement space 22 to protrude from the fixed frame 20.

A guiding means is provided between the movable member 21 and the movement space 22. By this guiding means, the distance between the edge of the yoke 25 of the fixed frame 20 and the edges of the yokes 29a, 29b, and 29c of the movable member 21 is held constant. The guiding means also supports the movable member 21 so that the movable member 21 can freely move in the longitudinal direction with respect to the fixed frame 20. For example, the guide means for the magnification varying unit 31 provided with with lenses 27a–27c may be constructed by a ball guide mechanism shown in FIG. 2 which includes a pair of V-shaped guide grooves 36a, 36b formed in the opposite inner surfaces of the fixed frame 20 to extend in its longitudinal direction, a pair of V-shaped guide grooves 37a, 37b formed in the opposite faces of the movable member 21 to face the guide grooves 36a, 36b, and a plurality of balls 38 inserted between the corresponding guide grooves 36a, 37a; 36b, 37b.

The smaller the plate thickness of the edges of the opposing yokes 25 and 29, the higher the positioning accuracy of the device. However, if the yokes are too thin, the yokes themselves deform, and this decreases the positioning accuracy in some instances. For this reason, it is desirable that the thickness of each yoke be approximately 0.3 to 1 mm and the distance between the edge of the yoke 25 of the fixed frame 20 and the edges of the yokes of the movable member 21 be approximately 0.5 to 1 mm. The thickness of each yoke may be set in accordance with the positioning accuracy, and the distance between the edge of the yoke 25 of the fixed frame 20 and the edges of the yokes 29a, 29b, and 29c of the movable member 21 may be preferably set in accordance with the moving force of the movable member 21.

A series of operations of the above arrangement when the first lens 27a is positioned on the optical axis Z from the state in which the second lens 27b, adjacent to the first lens 27a, is positioned on the optical axis Z as illustrated in FIG. 1 will be described below.

From the state shown in FIG. 1, the switching lever 30 is pulled to the right against the magnetic force acting between the permanent magnet 24 with the yoke 25 of the fixed frame 20 and the permanent magnet 28b with the yoke 29b of the movable member 21, thereby moving the movable member 21 to the right. By this movement of the movable member 21, the first lens 27a is moved close to the optical axis Z. Consequently, as in FIG. 3A, the yoke 29a on the N-pole side of the movable member 21 and the same N pole of the permanent magnet 24 of the fixed frame 20 come close to each other. Since in this state the lines of magnetic force from the magnets do not form a closed loop, only a repulsing force about the magnitude of a leakage flux is generated between the magnets. Additionally, there is a certain distance between the end face of the yoke 29a of the movable member 21 and the N pole of the permanent magnet 24 of the fixed frame 20, so the attracting force between the two is small. Consequently, the movable member 21 can be moved with a moving force equivalent to the moving force when the movable member 21 is unaffected by the lines of magnetic force. When the movable member 21 is further pulled to the right, as indicated by the arrow in FIG. 3A, by the switching lever 30, the N-pole yoke 29a of the movable member 21 and the S-pole yoke 25 of the fixed frame 20 oppose each other with the shortest distance, as illustrated in FIG. 3B. At the same time, the S pole of the permanent magnet 28a of the movable member 21 on the side away from the yoke 29a and the N pole of the permanent magnet 24 of the fixed frame 20 on the side away from the yoke 25 oppose each other. The result is that lines of magnetic force B form a closed loop.

As a consequence, since the distance between the edges of the yokes of the individual permanent magnets is smaller than the distance between the poles of the magnets on the side where there is no yoke, the attracting force on the yoke side becomes stronger, and this maximizes the attracting force between the magnets. Accordingly, the first lens 27a of the movable member 21 can be positioned on the optical axis Z.

Although the aforementioned embodiment is described to the magnification varying unit, it may be also suitable for an optical element positioning device of a slide type unit which changes the optical elements by linearly sliding them, such as an optical path changing unit 35 as shown in FIG. 8 which includes a total reflection mirror, a half mirror and a through hole.

As described above, in this embodiment of the present invention, accurate positioning can be performed because the positioning is done by using the magnetic force. Also, since the device has no mechanical contact portion, no impact force is produced, and the durability can be improved.

Where the magnification varying unit 31 of the aforementioned embodiment is used to the inverted microscope as shown in FIG. 8, and a manipulator 39 of a small diameter for operating cells or the like on the stage 33 of the microscope, the changing operation of the unit 31 may be performed in a very little vibration, thereby effectively preventing the manipulator 39 from undesirable influence due to the vibration.

(Second Embodiment)

The second embodiment of the present invention will be described below.

Figure 4:
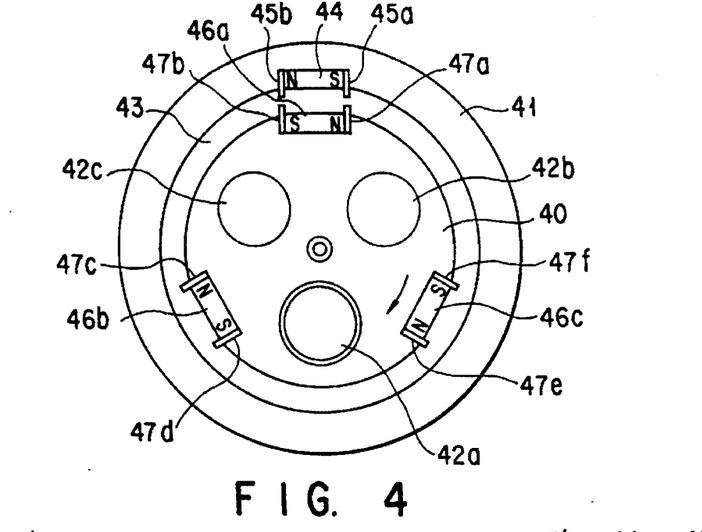
FIG. 4 is a partial sectional view of an optical element positioning device according to the second embodiment of the present invention.
Figure 5A:
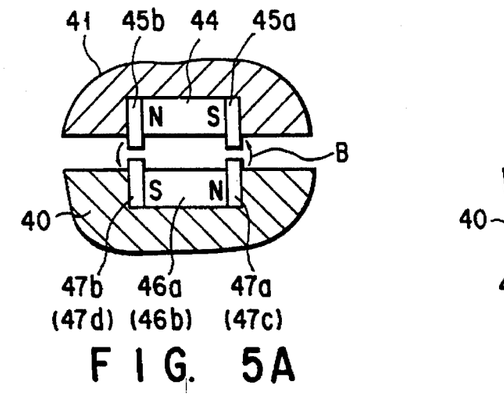
FIGS. 5A and 5B are enlarged views showing a portion of the device in FIG. 4 in different states.
Figure 5B:
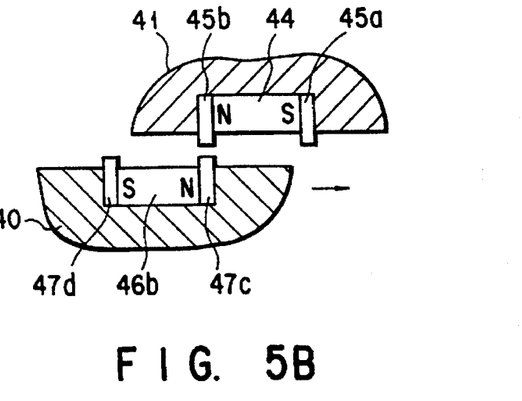

FIG. 4 is a partial sectional view of the second embodiment of the present invention. FIGS. 5A and 5B are enlarged views of a portion of FIG. 4.

A revolver of a microscope shown in FIG. 4 has a construction in which a disk-like movable member 40 made of a nonmagnetic material consisting of a copper alloy is, axially supported by the inner circumference of an annular fixed ring 41 made of a nonmagnetic material consisting of aluminum to rotate around the central axis through a ball-bearing mechanism. This movable member is so disposed that a predetermined distance is held between the outer circumferential surface of the movable member and the inner circumferential surface of the fixed ring, thereby defining an annular movement space 43 between these circumferential surfaces.

On one surface of the movable member 40, three objective lenses 42a to 42c of each different magnification are arranged at equal intervals on the same circumference centered around the central axis of the movable member. By rotating the movable member 40, it is possible to switch the magnifications of the objective lenses 42a to 42c. These objective lenses are detachably mounted in known mounting members such as screw holes extending from one side surface to the other of the movable disk 40.

In the movement space 43 described above, a permanent magnet 44 is embedded in the inner circumferential surface of the fixed ring 41 so that the order of the magnetic poles is N and S from the left. In this embodiment, the magnetic pole surface of the permanent magnet 44 is flat, so this magnetic pole surface is not positioned on the same curved surface as the inner circumferential surface of the fixed ring 41. It is, however, also possible to curve the magnetic pole surface so as to have the same curvature as the inner circumferential surface of the fixed ring 41. In this embodiment, as in the first embodiment described previously, it is preferable that the pole face of the permanent magnet 44 neither protrude nor withdraw from the inner circumferential surface of the fixed ring 41. Thin-plate yokes 45a and 45b made of a magnetic material are arranged on the two sides of the permanent magnet 44, i.e., on one side of the N-pole surface and one side of the S-pole surface of the magnet 44, so that the edges of these yokes 45a and 45b slightly protrude toward the movable member 40 from the surface of the permanent magnet 44. These yokes preferably have dimensions similar to those in the first embodiment.

As illustrated in FIG. 4, three rectangular-plate or rectangular-rod permanent magnets 46a, 46b, and 46c are disposed at equal intervals, i.e., intervals of 120°, on the outer circumferential surface of the movable disk 40. These permanent magnets are embedded in the outer circumferential surface of the movable disk 40 so that their magnetic pole surfaces are exposed. When the first objective lens 42a arranged on the movable member 40 is positioned on the optical axis, the first permanent magnet 46a is located in a portion, which opposes the yokes 45, of the outer circumferential surface of the movable member 40, such that the S and N poles of the first permanent magnet 46a oppose the N and S poles, respectively, of the permanent magnet 44 provided in the fixed ring 41. Likewise, when the second or third objective lens 42b or 42c is positioned on the optical axis, the second or third permanent magnet 46b or 46c is so located that its magnetic poles oppose the respective opposite poles of the permanent magnet 44 of the fixed ring 41. Thin-plate yokes 47a and 47b, 47c and 47d, and 47e and 47f, made of a magnetic material, are arranged on the two sides of the permanent magnets 46a, 46b, and 46c, respectively, so as to slightly protrude toward the fixed ring 41 from the surfaces of the permanent magnets.

When the objective lens 42a, 42b, or 42c of each different magnification arranged on the movable member 40 is positioned on the optical axis, a corresponding one pair of the three pairs of S- and N-pole yokes of the movable member 40 oppose the N- and S-pole yokes 45b and 45a of the fixed ring 41. Consequently, as in the first embodiment, lines of magnetic force in a closed-loop form are generated between the two permanent magnets via the respective yokes, and the lens is positioned accordingly.

A series of operations when the second objective lens 42b is positioned on the optical axis by rotating the movable member 40 from the state in which, as illustrated in FIG. 4, the first objective lens 42a is positioned on the optical axis, will be described below.

When the first objective lens 42a is positioned on the optical axis, the permanent magnets and the yokes are located to oppose each other as shown in FIGS. 4 and 5A.

From this state, the movable member 40 is rotated clockwise in FIG. 4 (to the right in FIG. 5A) against the magnetic force acting between the permanent magnet 44 with the yokes 45a and 45b arranged in the fixed ring 41 and the permanent magnet 46a with the yokes 47a and 47b arranged in the movable member 40. When the second objective lens 42b adjoining the first objective lens 42a is moved close to the optical axis by this rotation, the yoke 47c of the N pole of the movable member 40 and the yoke 45b of the same N pole of the fixed ring 41 come close to each other, as in FIG. 5B. Although the two yokes have the same polarity at that time, the lines of magnetic force form no closed loop in this state, so only a repulsing force of about the magnitude of a leakage flux is generated between these magnets. Since the resulting attracting force between the two magnets is small, it is possible to rotate the movable member 40 with a moving force equivalent to the moving force when the movable member is unaffected by the lines of magnetic force.

When the movable member 40 is further rotated clockwise, the N-pole yoke 45b of the fixed ring 41 and the S-pole yoke 47d of the movable member 40 oppose each other with the shortest distance, and the S-pole yoke 45a of the fixed ring 41 and the N-pole yoke 47c of the movable member 40 oppose each other with the shortest distance, as illustrated in FIG. 5A (in which the second permanent magnet is represented by (46b), and the pair of yokes arranged on the two sides of this magnet are represented by (47c) and (47d), for illustrative convenience). As a result, lines of magnetic force B in a closed-loop form are generated, and the attracting force between the magnets is maximized. Accordingly, the second objective lens 42b is positioned on the optical axis. In this manner, the device of this embodiment can position a target objective lens of the revolver on the optical axis by rotating the movable member or rotary disk 40.

According to this embodiment as described above, although the movable member is rotated, it does not produce any impact force and is not abraded. This allows an accurate positioning over long periods of time. Additionally, decreasing the distance between the edges of the opposing yokes arranged on the fixed and movable members produces an attracting force between the two yokes, and this can exceedingly enhance the click touch. Furthermore, the positioning accuracy can be improved by making the interval between the yokes of the fixed ring and the interval between the yokes of the movable member equal to each other.

As the revolver 34 of the inverted optical microscope as shown in FIG. 8, the revolver 34 used in the second embodiment may be used. In this case, when a manipulator 39 of a small diameter for operating cells or the like is attached on the stage 33 of the microscope, and then is used, the changing operation of the unit 31 may be performed in a very little vibration, thereby effectively preventing the manipulator 39 from undesirable influence due to the vibration.

In this embodiment, the yokes are arranged on the both sides of each permanent magnet. However, like the first embodiment, the yoke can also be arranged only on one side of each permanent magnet. Conversely, in the first embodiment, it is also possible to arrange the yokes on the both sides of each permanent magnet as in the second embodiment.

(Third Embodiment)

The third embodiment of the optical element positioning device of the present invention will be described below. In this third embodiment, the arrangements of the permanent magnets and the yokes in the second embodiment are modified. Note that the same reference numerals as in FIGS. 5A and 5B of the second embodiment denote the same parts in the third embodiment.

Figure 6A:
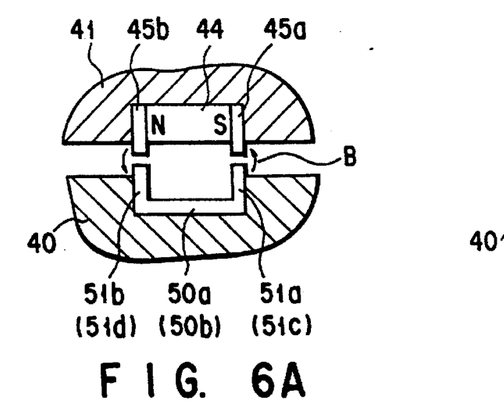
FIGS. 6A and 6B are enlarged views showing a portion of an optical element positioning device according to the third embodiment of the present invention in different states.
Figure 6B:
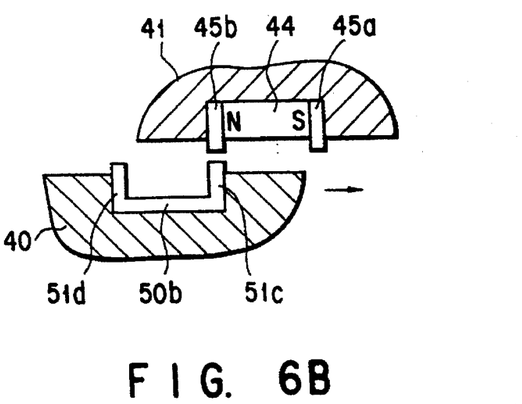

FIGS. 6A and 6B are enlarged views of a portion of the third embodiment.

In this optical element positioning device, first to third U-shaped yoke assemblies or profile yoke segments (only first and second yoke assemblies 50a and 50b are illustrated in FIGS. 6A and 6B) made of thin-plate magnetic materials are disposed in a movable member 40, in place of the first to third permanent magnets 46a–46c and the yokes 47a–47f on the both sides of these magnets used in the second embodiment. These yoke segments are disposed and fixed in three recessed portions formed at equal intervals in the outer circumferential surface of the movable disk 40. When each yoke segment is so located as to oppose a permanent magnet 44 of a fixed ring 41, opposing legs or yokes stripes (yokes of the first and second yoke assemblies 50a and 50b are represented by 51a and 51b, and 51c and 51d, respectively) of the yoke segment oppose yokes 45a and 45b arranged on the two sides of the permanent magnet 44 of the fixed ring 41 with the shortest distance between them.

A series of operations of the device of this third embodiment when one of objective lenses (not shown) different in magnification is positioned on the optical axis by rotating the movable member 40 from the state in which another objective lens adjoining the first objective lens is positioned on the optical axis will be described below.

When the first objective lens is positioned on the optical axis, the permanent magnet 44 with the yokes 45a and 45b being arranged in the fixed ring 41 and the first yoke segment 50a arranged in the movable member 40 oppose each other as illustrated in FIG. 6A. From this state, the movable member 40 is rotated clockwise (to the right in FIG. 6A) against the magnetic force acting between the permanent magnet 44 with the yokes 45a and 45b of the fixed ring 41 and the U-shaped yoke segment 50a of the movable member 40. By this rotation, the second objective lens is moved close to the optical axis. Consequently, as illustrated in FIG. 6B, the right side yoke strip 51c of the second yoke segment 50b of the movable member 40 and the N-pole yoke 45b of the fixed ring 41 come close to each other. Since lines of magnetic force B in this state form no closed loop, only a repulsing force of about the magnitude of a leakage flux is generated. This results in a slight attracting force acting between the magnet 44 and the yoke segment 50b. As a consequence, the movable member 40 can be rotated with a moving force equivalent to the moving force when the movable member 40 is unaffected by the lines of magnetic force B.

When the movable member 40 is further rotated clockwise (in the arrow direction), as shown in FIG. 6A, the S-pole yoke 45a of the fixed ring 41 and the right side yoke strip 51c of the second yoke segment 50b of the movable member 40 oppose each other with the shortest distance, and the N-pole yoke 45b of the fixed ring 41 and the left side yoke strip 51d of the yoke segment 50b of the movable member 40 oppose each other with the shortest distance. The result is that the lines of magnetic force passing between the yokes 45a and 45b and the yoke segment 50b form a closed loop. Since this maximizes the attracting force between the two yoke members, a target objective lens of the revolver can be positioned on the optical axis.

The distance between the edge of the yoke of the fixed ring 41 and the edge of the yoke of the movable member 40 at that time is set in accordance with the positioning accuracy and the stopping force (the click touch).

According to this embodiment, the device can be manufactured inexpensively since no permanent magnet is used in the movable member.

The present invention is not limited to the above embodiments but can be modified as follows.

Figure 7A:
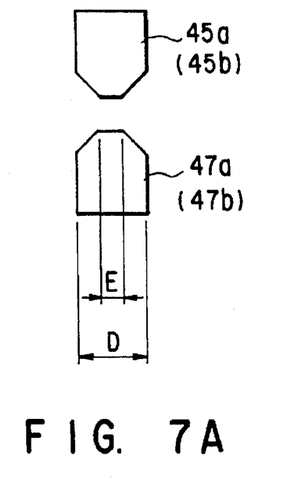
FIGS. 7A, 7B, and 7C are views showing modifications of the present invention.

To improve the positioning accuracy, the edge of the yoke preferably has a thickness as small as possible with which the yoke itself does not deform. For this purpose, as illustrated in FIG. 7A, the corners on the both sides of the edge of the yoke are preferably chamfered so that a thickness D of the portion contacting one magnetic pole of the permanent magnet is large and the thickness of an edge E of the yoke pertaining to the positioning accuracy is small. It is also possible to round the edge of the yoke, as in FIG. 7B, or shape the end face of the yoke into an arc, as in FIG. 7C. With any of these yokes, it is possible to improve the positioning accuracy, since the thickness of the edge of the yoke is decreased.

Figure 7B:
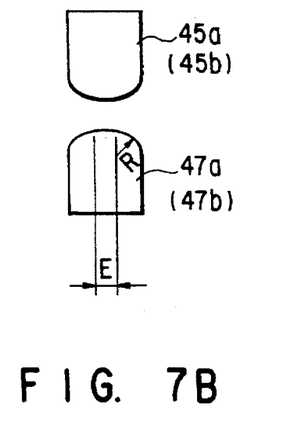
Figure 7C:
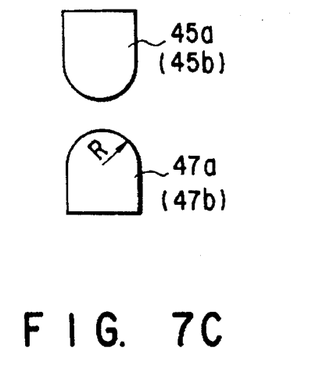

In FIGS. 7A and 7B, both the sides of the yoke are chamfered or rounded. However, it is also possible to chamfer or round only one side of the yoke. In addition, in the embodiment in which the yokes are disposed on the both sides of the permanent magnet, the distances from the edges of the two yokes in the fixed member to the edges of the two yokes in the movable member need not be the same; that is, only the opposing yokes on one side can be approached to each other. In this case, the stop position is determined by the position at which the two opposing yokes approach. Therefore, accurate positioning can be performed even if the distances between the N and S poles of the fixed member and the movable member are different. Also, in the embodiments, the N and S poles of the permanent magnet are arranged parallel to the moving direction of the movable member. However, the function and effect of the present invention remain unchanged even if the N and S poles are arranged not parallel to the moving direction, e.g., perpendicular to or at an arbitrary angle to the moving direction, provided that the yokes of the fixed member and the yokes of the movable member oppose each other. Furthermore, the function and effect remain unchanged even by use of electromagnets, instead of permanent magnets, so long as the attracting force can be produced. It is also possible to use a magnetic material such as pure iron, other than low-carbon steel, as the material of the yokes.

The positioning device of the present invention can be used not only as the lens switching device described in the embodiments but as an optical filter switching device. Also, the arrangements of the permanent magnets and the yokes in one embodiment can be used in other embodiments, and the positions of the yokes and the permanent magnets in the fixed member and the movable member are interchangeable.

According to the present invention, as has been described above, an optical element can be positioned at a reference position with a high accuracy, the durability can be improved, and the impact upon positioning can be reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical element positioning device comprising:

a fixed member fixed to an optical apparatus having an optical axis;

a movable member supported by said optical apparatus so as to be movable with respect to said fixed member, said movable member holding at least one optical element;

a first magnetic body arranged in said fixed member; and at least one second magnetic body disposed in said movable member, said second magnetic body being able to face said first magnetic body when said movable member is moved, wherein at least one of said first and second magnetic bodies has a magnetic pole surface which faces the other, and lines of attracting magnetic force are generated between said magnetic bodies when said magnetic bodies are made face each other, and at least one of said first and second magnetic bodies has an extending portion close to the other, and the lines of attracting magnetic force form a closed loop passing through said extending portion to give said movable member a force which stops said movable member, thereby positioning said optical element on the optical axis.

2. A device according to claim 1, wherein each of said first and second magnetic bodies includes first and second permanent magnets having magnetic pole surfaces of opposite polarities, and a magnetic piece magnetically connected to at least one of said permanent magnets, said magnetic piece having a width extending in a direction perpendicular to the moving direction of said movable member, and having said extending portion protruding from the magnetic pole surface of said permanent magnet.

3. A device according to claim 1, wherein each of said first and second magnetic bodies includes first and second permanent magnets having magnetic pole surfaces of opposite polarities, and yoke pieces magnetically connected to two end faces along the moving direction of said permanent magnets, each of said yoke pieces having a width extending in a direction perpendicular to the moving direction of said movable member, and having said extending portion protruding from the magnetic pole surface of said permanent magnet.

4. A device according to claim 3, wherein said yoke piece has a base portion contacting the surface of said permanent magnet and an edge extending from said base to constitute said extending portion, said edge having a thickness smaller than a thickness of said base portion.

5. A device according to claim 1, wherein said first magnetic body has a permanent magnet having a magnetic pole surface opposing said second magnetic body, and said second magnetic body has a pair of yoke pieces opposing two end portions along the moving direction of said first magnetic body, and a portion connecting said yoke pieces.

6. An optical element positioning device comprising:

a fixed member fixed to an optical apparatus having an optical axis;

a movable member supported by said optical apparatus so as to be movable with respect to said fixed member, said movable member holding a plurality of optical elements along the moving direction;

a first magnetic body arranged in said fixed member; and a plurality of second magnetic bodies equal in number of said optical elements, said second magnetic bodies being disposed in said movable member along the moving direction and selectively able to face said first magnetic body when said movable member is moved, wherein at least one of said first magnetic body and each of said second magnetic bodies has a magnetic pole surface which faces the other, and lines of attracting magnetic force are generated between said magnetic bodies when said magnetic bodies are made face each other, and at least one of said first magnetic body and each of said second magnetic bodies has an extending portion close to the other, and the lines of attracting magnetic force form a closed loop passing through said extending portion to give said movable member a force which stops said movable member, thereby positioning one of said optical elements on the optical axis.

7. An optical element positioning device comprising:

a fixed member having a circular inner circumferential surface with a central axis;

a circular movable member supporting a plurality of optical members and having an outer circumferential surface which faces the inner circumferential surface of said fixed member so as to define a movement space between the two circumferential surfaces, said movable member being rotatable around the central axis;

a permanent magnet embedded in the inner circumferential surface of said fixed member and having a magnetic pole surface magnetically exposed to the movement space;

a plurality of magnetic bodies embedded in said movable member in a one-to-one correspondence with said optical members and magnetically exposed to the movement space; and means, provided between said magnetic bodies and said permanent magnet, for generating lines of magnetic force in a closed-loop form between said magnetic body and said permanent magnet to give a braking force to said movable member when one of said magnetic bodies faces the magnetic pole surface of said permanent magnet.

8. A device according to claim 7, wherein said means for generating the lines of magnetic force in the closed-loop form is magnetically connected to at least one of said permanent magnet and said magnetic bodies and has a thin-plate yoke piece having an edge extending into the movement space.

* * * * *